United States Patent [19]
Firey

[11] Patent Number: 5,201,283
[45] Date of Patent: Apr. 13, 1993

[54] OPPOSED CROSS FLOW PRIMARY REACTORS FOR CYCLIC CHAR BURNING ENGINES AND GASIFIERS

[76] Inventor: Joseph C. Firey, P.O. Box 15514, Seattle, Wash. 98115-0514

[21] Appl. No.: 823,479

[22] Filed: Jan. 21, 1992

Related U.S. Application Data

[63] Continuation-in-part of Ser. No. 725,823, Jul. 3, 1991, Pat. No. 5,109,808.

[51] Int. Cl.$^5$ .............................................. F02B 45/00
[52] U.S. Cl. .......................................... 123/23; 123/3
[58] Field of Search ................. 123/1 R, 3, 23; 60/12, 60/39, 464

[56] References Cited

U.S. PATENT DOCUMENTS 4,907,565 3/1990 Bailey et al. ........................ 123/23

Primary Examiner—Noah P. Kamen

[57] ABSTRACT

Reacted gas reservoirs and reactant gas manifolds are added to primary reactors of cyclic char burning engines and gasifiers in order to create a flow of gas across the direction of motion of the solid char fuel. Preferably this cross flow direction through the rapid reaction zone is opposite to that through the volatile matter distillation zone. A larger and more stable rapid char fuel primary reaction zone can be created with this cross flow, and improved utilization of char fuel volatile matter can be achieved.

16 Claims, 4 Drawing Sheets

OPPOSED CROSS FLOW PRIMARY REACTORS FOR CYCLIC CHAR BURNING ENGINES AND GASIFIERS

CROSS REFERENCES TO RELATED APPLICATION

This application is a continuation in part of my earlier filed U.S. patent application entitled, Cross Flow Primary Reactors for Cyclic Char Burning Engines and Gasifiers, Ser. No. 07/725,823, filed Jul. 3, 1991, now U.S. Pat. No. 5,109,808. The invention described herein is related to my following U.S. patent applications:
1. Improved Starting Means for Char Burning Engines, Ser. No. 07/633256, filed Dec. 21, 1990, now standing allowed but not issued.
2. Two or More Flow Passages with Different Connection Placed for Cyclic Solid with Gas Reactors, Ser. No. 07/666019, Mar. 7, 1991.
3. Cyclic Char Fuel Oxidation Reactors With Cross Flow Primary Reactors, Ser. No. 07/731208, filed Jul. 15, 1991.
4. Cross Flow Char Fuel Gas Producers, Ser. No. 07/774608 filed Oct. 10, 1991.

SUMMARY OF THE INVENTION

Within the primary reactor of a cyclic char burning engines or gasifier the reactant air is caused to flow across the direction of motion of the char fuel A first air manifold is added with first reactant gas inlet ports along a first side of the primary reactor and along that portion of the length of the char fuel motion path adjacent to the rapid reaction zone. A producer gas reservoir is added with producer gas outlet ports on the opposite side of the primary reactor from the first inlet ports of the first air manifold and these producer gas ports positioned along that portion of the length of the char fuel motion path adjacent to the rapid reaction zone. During compression reactant air thus flows from the first air manifold, through the rapid reaction zone, in a first direction across the char fuel motion direction, and into the producer gas reservoir where the resulting producer gas is stored during compression.

A second air manifold is added with second reactant gas inlet ports along a second side of the primary reactor and along that portion of the length of the char fuel motion path adjacent to the char fuel preheat and volatile matter distillation zone. A volatile matter in air mixture reservoir is added with volatile matter in air mixture outlet ports on the opposite side of the primary reactor from the second inlet ports of the second air manifold and these volatile matter in air mixture ports positioned along that portion of the length of the char fuel motion path adjacent to the rapid reaction zone. During compression reactant air thus flows from the second air manifold through the char fuel preheat and volatile matter distillation zone, in a second direction across the char fuel motion direction, and into the volatile matter in air mixture reservoir where the resulting volatile matter in air mixture is stored during compression.

With these two separate reactant gas manifolds a different reactant gas can be used in the rapid reaction zone than is used in the char fuel preheat and volatile matter distillation zone. In some applications of cyclic char burning engines and gasifiers steam is utilized in the rapid reaction zone to increase the volumetric heating value of the resultant producer gas or to reduce the char fuel temperature in the rapid reaction zone below the ash fusion temperature. With the separate reactant gas manifolds of this invention steam can be thusly introduced into only the rapid reaction zone and steam assuredly need not be wasted by adding it needlessly into the char fuel preheat and volatile matter distillation zone. Similar economies of use can also be achieved by use of the two separate reactant gas manifolds of this invention when oxygen enrichment of the reactant gas flowing into the rapid reaction zone is utilized to increase the volumetric heating value of the resultant producer gas. These are among the beneficial objects of this invention.

The first side of the primary reactor is preferably opposite the second side of the primary reactor so that the first direction of gas flow across the char fuel motion direction is essentially opposite to the second direction of gas flow across the char fuel motion direction. In this way the heat transfer from the high temperature rapid reaction zone into the volatile matter distillation and char fuel preheat zone takes place under preferred gas counterflow conditions. It is necessary to thusly transfer heat from the rapid reaction zone into the volatile matter distillation and char preheat zone in order to both preheat the char fuel up to its rapid reaction temperature and to evaporate the volatile matter of the char fuel. Thus another beneficial object of this preferred form of the invention is the increased heat quantity transferable by use of counterflow of the gases between which heat is being transferred.

During-expansion the stored producer gas can reverse flow direction and flow out via the rapid reaction zone into the air manifold and thence into the variable volume chamber of the compressor and expander. Alternatively changeable gas flow connections can be used between the producer gas reservoir and the variable volume chamber so that producer gas flows wholly or partially unidirectionally into the variable volume chamber during expansion and may not all reverse flow direction. Additional changeable gas flow connections can be used between the variable volume chamber and the air manifold so that gas flow through the air manifold, the primary reaction chamber, and the producer gas reservoir, is essentially wholly unidirectional during both compression and expansion.

As described above for the producer gas reservoir the flow of the volatile matter in air mixture out of its reservoir during expansion can also be unidirectional, in whole or part, by use of changeable gas flow connections, or can be reversed when such changeable gas flow connections are not used.

Tar reduction by mixing air into emerging coal volatile matter can be achieved by use of this invention without appreciable burnup of the volatile matter in air mixture since this mixture passes largely into the volatile matter in air reservoir and only small portions may enter the high temperature rapid reaction zone. In this way carbon dioxide formation is avoided and an excessively large primary reaction chamber is not required. Also excessive temperatures from burnup of volatile matter in air mixture and consequent ash fusion with clinker formation are also avoided. These are among the beneficial objects made available by the devices of this invention.

The producer gas reservoir can be fitted with a particle separator means and the ash particles can then be allowed to carry over into the producer gas reservoir.

Ash removal from the producer gas reservoir is simpler than from the ash collection end of the primary reactor since whatever is collected in the producer gas reservoir can be removed as ashes without concern for removing unburned char fuel from the primary reactor. Similar particle separator means can also be used in the volatile matter in air mixture reservoir to separate such tar particles as are formed and these can then be removed by an ash removal type of mechanism. These are additional beneficial objects made available by the devices of this invention.

BACKGROUND OF THE INVENTION

1. Field of the Invention:

This invention is in the field of cyclic char burning engines and gasifiers wherein the cycle of compression followed by expansion is created by a combined compressor and expander means such as a piston and cylinder type of internal combustion engine mechanism.

2. Description of the Prior Art

Examples of prior art cyclic char burning engines and gasifiers are described in the following U.S. Patents:

U.S. Pat. No. 4,372,256; J. C. Firey, Feb. 8, 1983
U.S. Pat. No. 4,412,511; J. C. Firey, Nov. 1, 1983
U.S. Pat. No. 4,653,436; J. C. Firey, Mar. 31, 1987
U.S. Pat. No. 5,027,752; J. C. Firey, Aug. 2, 1991
U.S. Pat. No. 5,002,024; J. C. Firey, Mar. 26, 1991
U.S. Pat. No. 4,794,729; J. C. Firey, Jan. 3, 1989

In these example cyclic char burning engines and gasifiers air, or other reactant gas containing appreciable oxygen gas, is compressed into the pore spaces of a solid char fuel, contained within a separate primary reaction chamber, during a compression process and this is followed by expansion of the primary reacted gases, formed by reaction of oxygen with the char fuel, out of the pore spaces of the char fuel during an expansion process. This cycle of compression followed by expansion is repeated. This cycle of compression and expansion is created by a combined means for compressing and expanding, such as a piston operated within a cylinder, wherein the space enclosed by the piston crown and the cylinder walls is a variable volume chamber whose volume varies cyclically when the piston is reciprocated by an internal combustion engine mechanism for driving this combined means for compressing and expanding. Following each expansion process the reacted gases are largely removed from the variable volume chamber by an exhaust means. Fresh air is next supplied into the variable volume chamber by an intake means prior to the next following compression process. Thus an exhaust process followed by an intake process is interposed between each expansion process and the next compression process for a cyclic char burning engine or gasifier as is well known in the art of internal combustion engines. Each compression process occupies a compression time interval which is followed by an expansion process occupying an expansion time interval. The separate primary reaction chamber is contained within a pressure vessel container. A means for preheating the char fuel within the primary reaction chamber is used to bring the char fuel up to that temperature at which it will react rapidly with oxygen in adjacent compressed gases while the engine or gasifier is being started. Thereafter the means for preheating the char fuel can be turned off when the heat of the primary reaction becomes sufficient to keep the char fuel at or above this rapid reaction temperature. During starting a cranking means is used to drive the internal combustion engine mechanism. The detailed descriptions of cyclic char burning engines and gasifiers contained in the above listed U.S. Patents are incorporated herein by reference thereto.

The term char fuel is used herein and in the claims to include highly carbonaceous and largely solid fuels such as coal, coke, charcoal, petroleum coke, etc.

As char fuel is reacted to ashes within the primary reactor it is replaced by a refuel mechanism means for supplying fresh char fuel into a refuel end of the primary reactor. The char fuel is thus moved along through the primary reactor toward an opposite ash collection end of the primary reactor. Hence the char fuel being reacted within the primary reactor has a direction of motion from the refuel end toward the ash collection end. An ash removal mechanism is used as a means for removing ashes from the primary reaction chamber.

Where air is the reactant gas it is readily available from the atmosphere. In some applications oxygen enriched air or essentially pure oxygen may be used as the reactant gas, as for example in some gasifier uses, and here a source of oxygen rich gas is needed.

The term producer gas is used herein and in the claims to mean those reacted gases emerging from the primary reactor during expansion when an essentially all carbon fuel is used and this is normally a fuel gas containing carbon monoxide and other components.

The term secondary reacted gas is used herein and in the claims to mean those reacted gases within the secondary reactor, and for engines these are normally essentially complete combustion products containing carbon dioxide and other components.

In engine applications of cyclic char burning engines and gasifiers the variable volume chamber is also a secondary reaction chamber comprising an igniter means for burning the primary reacted gases with secondary air during the expansion process. The needed secondary air is retained outside the char fuel primary reactor during compression. In gasifier applications of cyclic char burning engines and gasifiers no secondary air is thusly retained and thus the variable volume chamber is not a secondary reaction chamber. Hence for cyclic char burning gasifiers the final reacted gas during expansion is essentially the fuel gas product from the primary reactor. For both a cyclic char burning engine and a cyclic char burning gasifier net work output can be done on the piston, since both the primary and secondary reactions are exothermic and are carried out under varying pressures of the cycle. Herein and in the claims the term power reactor is used to mean either a cyclic char burning engine or a cyclic char burning gasifier.

The term fixed open gas flow connection is used herein and in the claims to mean a gas flow passage which remains open whenever the cyclic char burning engine or gasifier is operating.

The term changeable gas flow connection is used herein and in the claims to mean a gas flow passage which can be opened or closed while the cyclic char burning engine or gasifier is operating. A changeable gas flow connection is opened and closed by a means for opening and closing and this is driven from the internal combustion engine mechanism drive means as is well known in the art of internal combustion engines.

As the char fuel, within the primary reactor, moves along the char fuel motion direction it is preheated by heat transfer from char fuel portions which are further along and are reacting rapidly with oxygen and thus are at a high temperature. Where the char fuel being used is essentially free of volatile mater, as with coke fuel, this preheat zone serves to bring the new char fuel up to its rapid reaction temperature. The char fuel then enters the rapid reaction zone and carbon reacts therein with oxygen to form producer gas. Beyond the rapid reaction zone in the direction of char fuel motion the char fuel is essentially completely reacted to ashes which pass into an ash collection zone at the end of the char fuel motion path.

When the char fuel being used contains volatile matter, as with bituminous coal, the char fuel preheat and volatile matter distillation zone also serves to remove the volatile matter from the coal, in part by distillation and in part by reaction to volatile products. In the absence of oxygen appreciable portions of this distilled volatile matter become tars and other portions become fuel gases of essentially hydrocarbon type. These tars from coal volatile matter are undesirable in a cyclic char burning engine or gasifier as they tend to clog up the mechanical components of the internal combustion engine mechanism and to foul any spark igniters used in the secondary reactor. Tars which are exhausted from the cyclic char burning engine or gasifier are also an undesirable air pollutant material.

In prior art, steady pressure, gas producers tar formation from coal volatile matter has been successfully reduced by passing the primary reactant air first into the char fuel preheat and volatile matter distillation zone. The emerging volatile matter apparently reacts with oxygen in the air to form oxygenated hydrocarbon type materials which form much less tar. The resulting volatile matter in air mixture then passes into the rapid reaction zone. Within the rapid reaction zone the volatile matter in air mixture is apparently burned in appreciable part to fully reacted carbon dioxide and steam. The carbon dioxide and steam, plus any unreacted oxygen, then react with carbon in the rapid reaction zone to form producer gas which emerges from the primary reactor. One disadvantage of this method for reducing tar formation is that the initial burning of the volatile matter in air mixture on entering the rapid reaction zone creates very high temperatures there and ash fusion and clinkering may result. These clinkers clog up the motion of the char fuel along the char fuel motion direction and may encase carbon particles and thus prevent complete carbon gasification. Another disadvantage of this method for reducing tar formation is that the carbon dioxide and steam created by burnup of the volatile matter in air mixture, react much more slowly with hot carbon in the rapid reaction zone to form producer gas. In prior art, steady pressure, gas producers this latter disadvantage was overcome by use of deeper rapid reaction zones of larger cross sectional area so that the required producer gas reaction could be completed. But when primary producer gas reactors are to be used on cyclic char burning engines or gasifiers such large volume reactors cannot be used since engine compression ratio would be greatly reduced and power producing efficiency also greatly reduced. It would be very desirable to have available a method for reducing tar formation from high volatile matter char fuels which did not produce clinkers and did not require a large volume primary reactor.

In prior art cyclic char burning engines and gasifiers the ashes are removed from the ash collection zone of the primary reactor at the end of the char fuel motion path by an ash removal mechanism. Most such ash removal mechanisms remove a volume of material at intervals and it is necessary to control either the volume, or the interval, or both, so that only ashes, and no unburned char fuel, are removed. While such control means are feasible they are necessarily complex since it is difficult to sense the ash quantity and ash level existing within the ash collection zone. It would be desirable to have available an ash removal means which did not require such sensing of ash level within the primary reactor.

DESCRIPTION OF THE PREFERRED EMBODIMENTS

Figure 1:
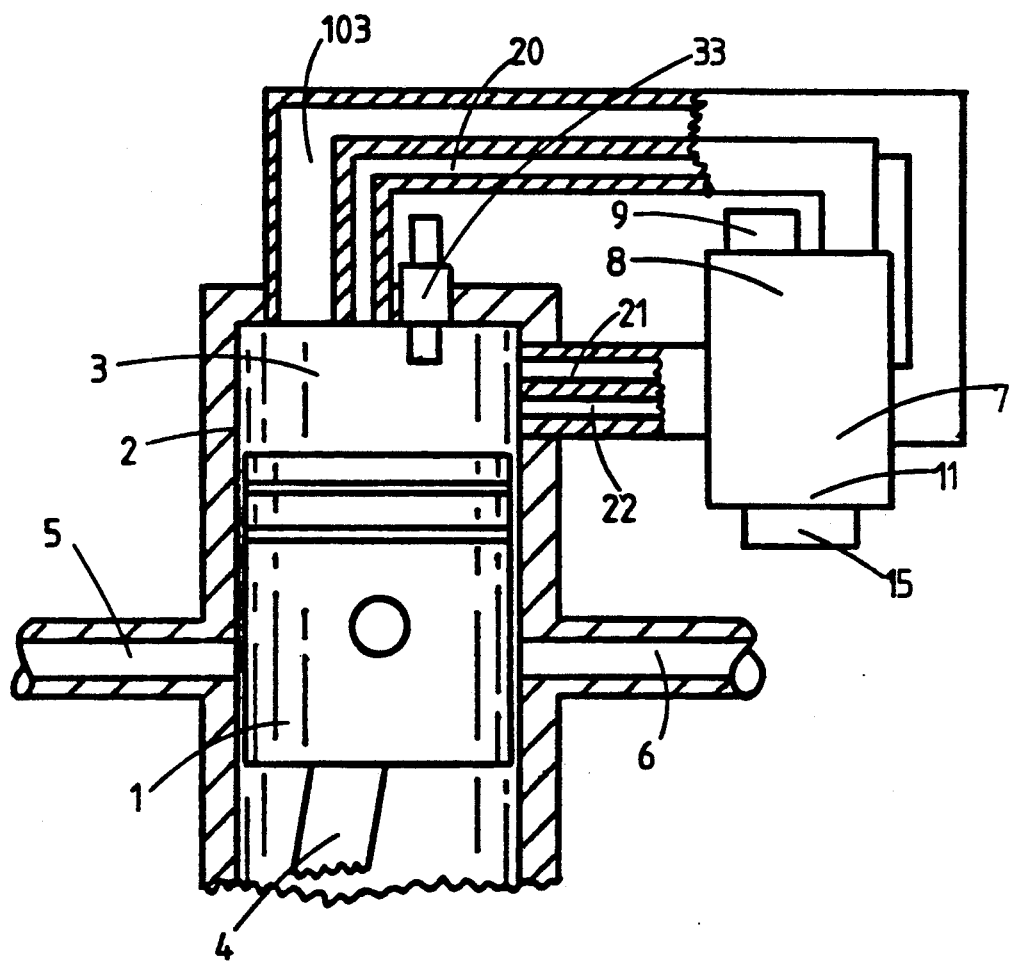
FIG. 1 shows an example of a primary reactor of a cyclic char burning engine.
Figure 2:
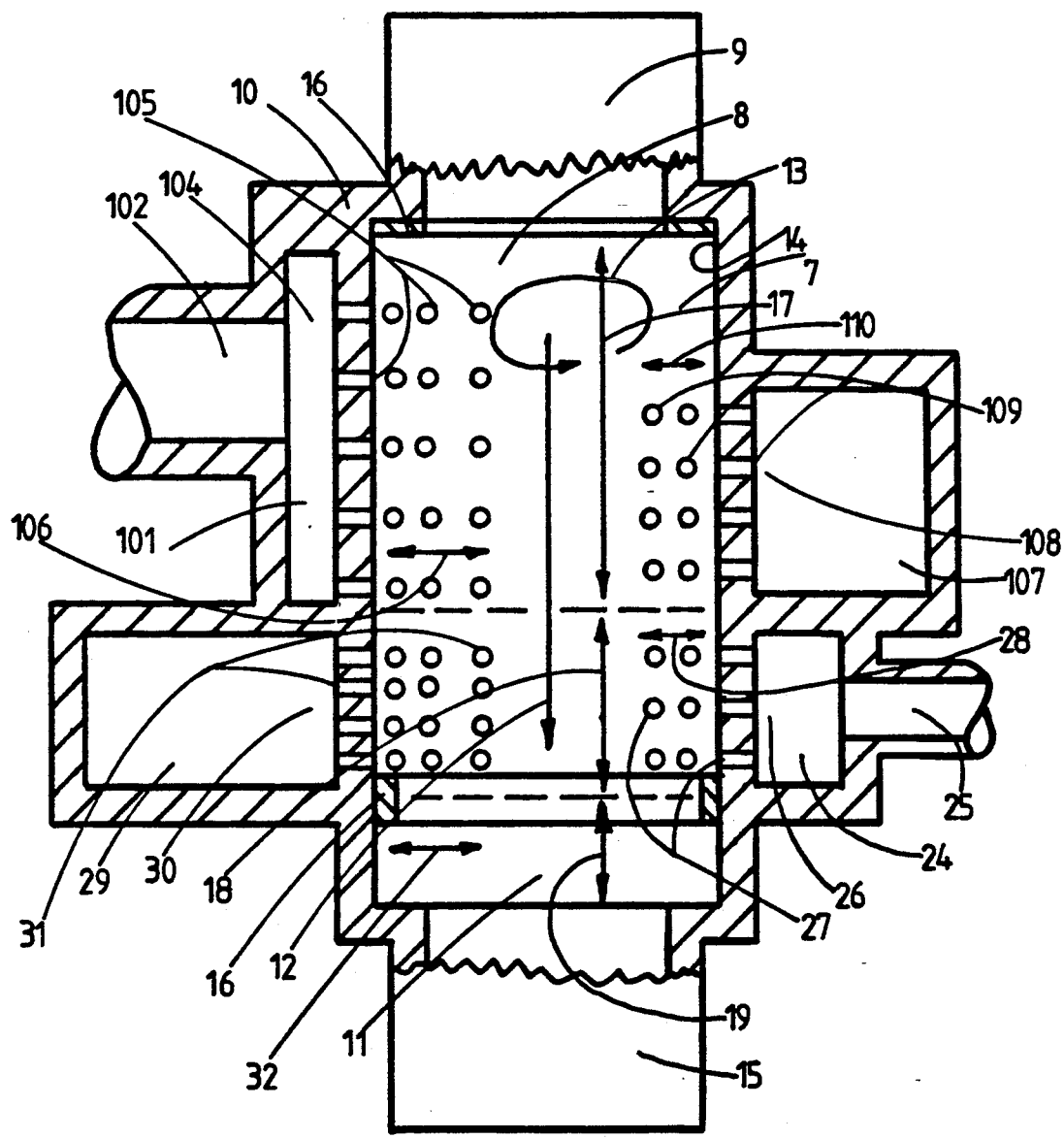
FIG. 2 shows a particular arrangement of a reaction chamber

All forms of this invention are improvements to cyclic char burning engines or gasifiers using a separated primary reaction chamber, an example of which is shown schematically in FIG. 1, and 2, and comprises:

1. A combined means for compressing and expanding gases comprising: a piston, 1; operative within a cylinder, 2; and these enclosing a variable volume chamber, 3; whose volume varies cyclically as the piston is reciprocated by a drive means, 4, only the connecting rod of which is shown in FIG. 1. The drive means, 4, reciprocates the piston, 1, thus varying the volume of the variable volume chamber, 3, creating a compression process for a compression time interval when the piston, 1, is rising and decreasing the volume of the variable volume chamber, 3, and creating an expansion process for an expansion time interval when the piston, 1, is descending and increasing the volume of the variable volume chamber, 3. The combined means for compressing and expanding shown in FIG. 1 further comprises: an intake means, 5, for placing air as reactant gas into the variable volume chamber, 3, prior to each compression process when the piston, 1, is at the bottom portion of its stroke; a exhaust means, 6, for removing reacted gases from the variable volume chamber, 3, after each expansion process when the piston, 1, is again at the bottom portion of its stroke. A two stroke cycle internal combustion engine mechanism is shown in FIG. 1 but four stroke cycle internal combustion engine mechanisms can also be used. Also drive means other than the crank and connecting rod mechanism of FIG. 1 can also be used such as the Wankel engine mechanism.

2. A separated primary reaction chamber, 7, contains char fuel which is added into the refuel end, 8, thereof by a refuel mechanism, 9, and this primary reactor comprises: a pressure vessel container, 10, to contain the primary reaction chamber, 7; an ash collection end, 11; a char fuel direction of motion, 12, from the refuel end, 8, toward the ash collection end, 11, in which direction the char fuel moves as it is being reacted and consumed within the primary reactor, 7; a peripheral dimension, 13, around the outer surface, 14, of the primary reactor, 7, at right angles to the char fuel motion direction, 12; an ash removal mechanism, 15, which in this FIG. 1 and 2 example removes ashes from the ash collection end, 11, of the primary reactor, 7; a starting heater means, 16, for preheating the char fuel in the primary reactor, 7, up to that temperature at which it reacts rapidly with oxygen in adjacent compressed reactant gas when the engine is being started. For this example starting heater shown in FIG. 2, electrodes, 16, are used to pass a heating electric current directly through the char fuel itself and an electrically conductive char fuel is to be used during startup.

3. The fresh char fuel refueled into the refuel end, 8, of the primary reactor, 7, is cold, and will not react with compressed air, but is heated by conduction from those char fuel portions deeper into the primary reactor which are at a high temperature and are reacting rapidly with oxygen to create producer gas. Thus the first portion, 17, of the primary reaction chamber along the char fuel motion direction, 12, is a char fuel preheat zone, 17, and distillation of volatile matter takes place here also when char fuels containing volatile matter are being used. At the end of the char fuel preheat and volatile matter distillation zone, 17, the char fuel is at or above its rapid reaction temperature and enters the rapid reaction zone portion, 18, of the primary reaction chamber along the char fuel motion path, 12, where char fuel reacts rapidly with oxygen in adjacent compressed reactant gases to create a producer gas product, and the heat of this reaction maintains the rapid reaction zone at or above the char fuel rapid reaction temperature. Within the rapid reaction zone, 18, of the char fuel reactor, 7, the carbon of the char fuel is gasified to producer gas and leaves only the ashes which collect in the ash zone, 19, at the ash collection end, 11, of the char fuel motion path, 12.

The devices of this invention comprise additions to the separate primary reaction chamber, 7, of the cyclic char burning engines or gasifiers, as described hereinabove, for the purpose of achieving more efficient utilization of those char fuels containing appreciable volatile matter, such as bituminous coal. One example of these additions to the primary reactor, 7, is shown in FIG. 2 and comprises:

4. A first reactant gas manifold, 24, is added whose inlet, 25, connects to the variable volume chamber, 3, of the combined compressor and expander via the first connection, 20. The outlet, 26, of the first reactant gas manifold, 24, connects to several first ports, 27, into the primary reaction chamber, 7. These first reactant gas ports, 27, are positioned along that portion of the length of the char fuel motion path, 12, through the primary reactor, 7, which is adjacent to the rapid reaction zone, 18, and are positioned around a first inlet portion, 28, of the peripheral dimension, 13, of the primary reactor.

5. A producer gas reservoir, 29, is added whose inlet, 30, connects to several ports, 31, into the primary reaction chamber, 7. These producer gas ports, 31, are distributed along that portion, 18, of the char fuel motion path, 12, adjacent to the rapid reaction zone of the char fuel, and are positioned around a first outlet portion, 32, of the peripheral dimension, 13, of the primary reactor, 7.

6. The producer gas ports, 31, are preferably located on the side of the primary reactor opposite the first reactant gas ports, 27. Thus the first outlet portion of the primary reactor periphery is preferably opposite the first inlet portion thereof.

7. A second reactant gas manifold, 101, whose inlet, 102, connects to the variable volume chamber, 3, of the combined compressor and expander via the second connection, 103. The outlet, 104, of the second reactant gas manifold, 101, connects to several second ports, 105, into the primary reaction chamber, 7. These second reactant gas ports, 105, are positioned along that portion of the length of the char fuel motion path, 12, through the primary reactor, 7, which is adjacent to the char fuel preheat and volatile matter distillation zone, 17, and are positioned around a second inlet portion, 106, of the peripheral dimension of the primary reactor.

8. A volatile matter in air reservoir, 107, is added whose inlet, 108, connects to several ports, 109, into the primary reaction chamber, 7. These volatile matter in air mixture ports, 109, are distributed along that portion, 17, of the char fuel motion path, 12, adjacent to the char fuel preheat and volatile matter distillation zone, 17, and are positioned around a second outlet portion, 110, of the peripheral dimension, 13, of the primary reactor, 7.

9. The volatile matter in air mixture ports, 109, are preferably located on the side of the primary reactor, 7, opposite the second reactant gas ports, 105. Thus the second outlet portion of the primary reactor periphery is preferably opposite the second inlet portion thereof.

10. The producer gas ports, 31, the first reactant gas ports, 27, the volatile matter in air mixture ports, 109, and the second reactant gas ports, 105, preferably have at least one area cross section dimension which is smaller than the char fuel particles being refueled into the primary reactor, 7. These ports can be of various shapes such as round holes or slots.

11. The second inlet portion, 106, of the peripheral dimension, 13, is shown in FIG. 2 as being on the opposite side of the primary reactor from the first inlet portion, 28, of the peripheral dimension, 13, and this opposed arrangement may be preferred in some applications of cyclic char burning power reactors. With this opposed arrangement the gases cross flowing through the rapid reaction zone, 18, move in counterflow to the gases cross flowing through the char fuel preheat and volatile matter distillation zone, 17. But this opposed arrangement with gas counterflow is not necessary and other arrangements can also be used instead.

The operation of the particular example of this invention shown schematically in FIG. 1 and FIG. 2 is as follows:

1. When the cyclic char burning engine or gasifier of FIG. 1 is to be started, an electric current is passed through the char fuel in the primary reactor 7, via the electrodes, 16, which heats up the char fuel to its rapid reaction temperature. The internal combustion engine mechanism drive means, 4, is then cranked by a cranking means for starting and cycles of compression followed by expansion are created within the variable volume chamber, 3. Prior to each such compression, air as reactant gas is placed inside the variable volume chamber, 3, by the intake means, 5. Following each such expansion reacted gas is removed from the variable volume chamber, 3, by the exhaust means, 6.

2. During compression compressed air flows from the variable volume chamber, 3, via the first fixed open gas flow connection, 20, into the first reactant gas manifold, 24, and thence via the first reactant gas ports, 27, into and across the primary reaction chamber, 7. Within the rapid reaction zone, 18, air reacts rapidly with hot char fuel to form producer gas which flows via the producer gas ports, 31, into the producer gas reservoir, 29. Producer gas is thus stored during compression within the producer gas reservoir, 29, as well as within the pore spaces of the rapid reaction zone, 18.

3. During expansion producer gas flows out of the producer gas reservoir, 29, reaction zone, 18, into the first reactant gas manifold, 24, via the first reactant gas ports, 27, and into the variable volume chamber, 3, via the first gas flow connecting means, 20. For this FIG. 2 form of the invention the gas flow direction during expansion is thus the reverse of the flow direction during compression. The gas flows in principal part also across the direction of motion, 12, of the char fuel through the primary reactor, 7.

4. Also during compression compressed air flows from the variable volume chamber, 3, via the second fixed open gas flow connection, 103, into the second reactant gas manifold, 101, and thence via the second reactant gas ports, 105, into and across the primary reaction chamber, 7. Within the char fuel preheat and volatile matter distillation zone, 17, reactant air and evaporated volatile matter mix together to form a volatile matter in air mixture which flows via the volatile matter in air mixture ports, 109, into the volatile matter in air reservoir, 107. Volatile matter in air mixture is thus stored during compression within the volatile matter in air reservoir, 107, as well as within the pore spaces of the char fuel preheat and volatile matter distillation zone, 17.

5. During expansion volatile matter in air mixture flows out of the volatile matter in air reservoir, 107, char fuel preheat and volatile matter distillation zone, 17, into the second reactant gas manifold, 101, via the second reactant gas ports, 105, and into the variable volume chamber, 3, via the second gas flow connecting means, 103. For this FIG. 2 form of the invention, the gas flow direction during expansion is thus the reverse of the flow direction during compression. The gas flows in principal port also across the direction of motion, 12, of the char fuel through the primary reactor, 7.

6. For this FIG. 2 form of the invention the reactant gas and producer gas cross flow direction through the rapid reaction zone is opposite to the cross flow direction of reactant gas and volatile matter in air mixture through the char fuel preheat and volatile matter distillation zone during both the compression time interval and the expansion time interval.

7. Where the cyclic char burning power reactor is an engine, secondary air may be retained within the variable volume chamber, 3, and mixed with the producer gas flowing thereinto during expansion to create a combustible mixture and this mixture together with the volatile matter in air mixture can then be ignited by a spark or other igniter means, 33.

Essentially complete combustion of the producer gas in air can thus be achieved by a secondary reaction within the variable volume chamber, 3, and work is produced by this engine cycle of compression, reaction, and expansion. In this engine case the variable volume chamber, 3, thus becomes also a secondary reaction chamber.

8. This cycle of intake, compression, reaction, expansion and exhaust is repeated. The starting heater means, 16, is turned off when the heat of the primary producer gas reaction within the primary reactor, 7, is sufficient to maintain the char fuel at its rapid reaction temperature within the rapid reaction zone, 18. The cranking means for starting is turned off when the net work of the cycle is sufficient to keep the engine running.

9. With the scheme of this invention shown in FIG. 2 air enters the rapid reaction zone, 18, from above, from the side, and from below via the ash collection zone, 19, A large and stable rapid reaction zone is thusly created by this ready air access thereto. Additionally those air portions passing through the ash collection zone, 19, are preheated therein, in part by conduction from the hot ash particles, and in part by final burnup of any carbon reaching the ash collection zone. This preheated air elevates the char fuel temperature in the rapid reaction zone. In these ways full char fuel burnup is obtained, a large and stable rapid reaction zone is created some of whose air supply is preheated and these are among the beneficial objects made available by use of the schemes of this invention.

10. Most of the volatile matter in air mixture is kept out of the rapid reaction zone and in consequence is not burned therein to carbon dioxide and water vapor. By thus preventing or reducing the full combustion of the volatile matter in air mixture, appreciable formation of slow reacting carbon dioxide and water vapor within the rapid reaction zone is prevented, and the ash fusion and klinker formation consequent upon the high temperatures resulting from such full combustion are prevented or reduced. These are further beneficial objects made available by use of the FIG. 2 form of this invention.

Prior art, steady pressure, gas producers have also separated the volatile matter in air mixture from the rapid reaction zone as shown for example in the Westinghouse double zone gas producer. A description of this Westinghouse gas producer is presented in the book, Gas Engines and Producers, L. S. Marks and H. S. McDewell, American Technical Society, Chicago, 1919, on page 26 and 27 of the second, *Gas Producers* section therein.

11. The opposed cross flow form of this invention shown in FIG. 2 and described hereinabove may be preferred when char fuels being used contain a large amount of volatile matter. A large volatile matter quantity will require a large air quantity to create a stoichiometric or near stoichiometric volatile matter in air mixture. Hence a large heat quantity must be transferred from the hot char fuel and producer gas in the rapid reaction zone into the char fuel preheat and volatile matter distillation zone, not only to evaporate the large volatile matter quantity, but also to heat up the large air quantity going into the volatile matter in air mixture. With the opposed cross flow as shown in FIG. 2, this heat transfer occurs under the counterflow conditions described which makes available a larger quantity of heat transferable than can be transferred under parallel flow conditions. This is a beneficial object achievable by use of the opposed cross flow form of this invention.

A richer producer gas of higher volumetric heating value can be created by admitting steam into the rapid reaction zone where the producer gas is formed. This reaction of steam with hot carbon to form additional carbon monoxide and hydrogen fuels is endothermic and can thus also be used to prevent excessively high temperatures in the rapid reaction zone. We wish to thusly limit rapid reaction zone temperature in order to minimize ceramic liner durability problems and also ash fusion and klinker problems. Producer gas volumetric heating value can also be increased by oxygen enrichment of the reactant gas entering the rapid reaction zone. But we only want such steam and/or enriching oxygen to pass into the rapid reaction zone where producer gas is being formed. Use of the separate first and second reactant gas manifolds of this invention permits such efficient utilization of steam and oxygen since these gases can be put only into the first reactant gas manifold from which reactant gases flow into the rapid reaction zone.

Figure 3:
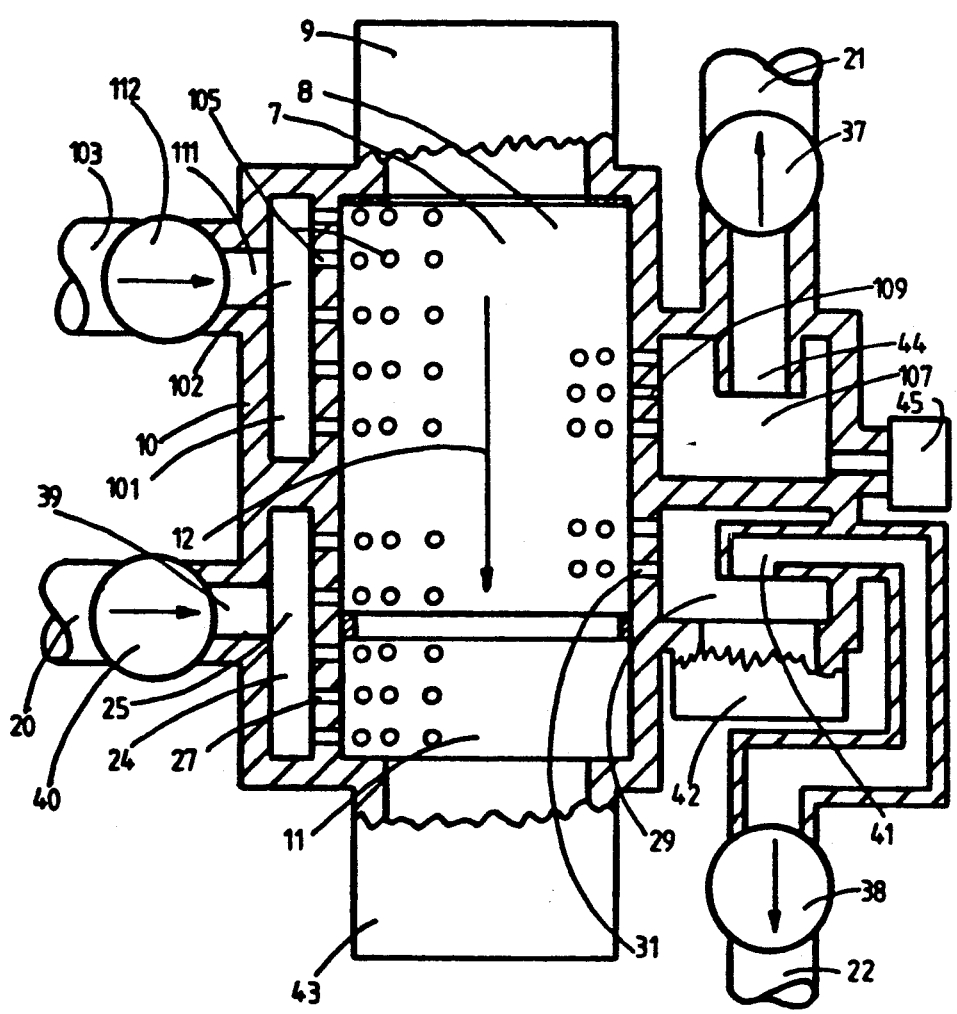
FIG. 3 shows another embodiment of a reaction chamber.

For prior art cyclic char burning engines and gasifiers ash removal mechanism, 43, means for removing ashes were used to remove ashes from the ash collection end, 11 of the primary reactor, 7, as shown in FIG. 3, and this method can also be used for the present invention. Alternatively, or additionally, ashes can be carried over from the ash collection end, 11, into the producer gas reservoir, 29, and there separated from the gas and then removed from the producer gas reservoir. For this purpose the producer gas ports, 31, are made larger in cross section than the ash particles, a separator means, 41, for separating particles from the producer gas is placed in the producer gas reservoir, 29, and an ash removal mechanism, 42, is installed on the producer gas reservoir, 29, as shown schematically in FIG. 3. Various types of gas solid separators can be used as the separator means, 41, such as cyclone separators or other centrifugal force separators. It is simpler to remove ashes from the producer gas reservoir since whatever particles are collected there can be removed without fear of removing any reactable char fuel from the primary reaction chamber. The ash removal mechanism, 43, which removes ashes from the ash collection end, 11, of the primary reactor, 7, needs to be controlled so that only ashes and not char fuel are removed. In similar fashion a separator means, 44, for separating solid or liquid particles from the gaseous volatile matter in air mixture, can be installed in the volatile matter in air mixture reservoir, 107, together with an ash removal mechanism, 45, means for removing solid and liquid particles. Liquid tars are the principal material separated from the volatile matter in air mixture and a liquid drain valve is one form of ash removal mechanism, 45, suitable for use here.

Char fuels vary greatly in the proportion of volatile matter they contain; fuels such as coke or anthracite containing little or no volatile matter, whereas fuels such as bituminous coal, wood, biomass, etc. may contain well in excess of fifty percent volatile matter by weight. Hence the ratio of the volume within which the volatile matter in air mixture is stored to the volume within which the producer gas is stored during compression is preferably different for different char fuels differing in volatile matter content. The optimum value of this volumes ratio is best determined experimentally for each char fuel in a running cyclic char burning engine or gasifier. Various criteria of optimization can be chosen. For example, in gasifier applications the product fuel gas energy content per unit volume could be maximized. For engine applications engine torque or efficiency could be maximized. An approximation of the best value for this volumes ratio can be estimated from the proximate and ultimate analyses of the char fuel corrected to an ash and moisture free basis (maf basis) and using the following relations:

$$(GVR) = (GR)\left(\frac{MWP}{MWVMA}\right)\left(\frac{TVMA}{TPR}\right)$$

Wherein:

$$(GVR) = \frac{\text{(Vol. of Volatile Matter Air Mixture)}}{\text{(Vol. of Producer Gas)}} = \frac{(VVMA)}{(VPR)}$$

(VVMA) = Volume of volatile matter in air mixture within its reservoir and within the char fuel preheat and distillation zone of the primary reactor at end of compression;

(VPR) = Volume of producer gas within its reservoir and within the rapid reaction zone of the primary reactor at end of compression;

$$(GR) = \frac{\text{(MAss of Volatile Matter Air Mixture)}}{\text{(Mass of Producer Gas)}}$$

$$(GR) = \frac{12(n - F) + m + 16r + 4.76(29)\left(n - F + \frac{m}{4} - \frac{r}{2}\right)}{28F + 64s + (28)[3.76\left(\frac{F}{2} + s\right) + \frac{t}{2}]}$$

$$n = \frac{(c)(MWC)}{(12)(100)}$$

$$m = \frac{(H)(MWC)}{(100)}$$

$$r = \frac{(O)(MWC)}{(16)(100)}$$

$$s = \frac{(S)(MWC)}{(32)(100)}$$

$$f = \frac{(N)(MWC)}{(14)(100)}$$

(MWC) = Assumed char fuel molecular weight. Values of 1000 to 10000 can be used here with no effect on volumes ratio.

C = Wt. percent carbon by ultimate analysis of char fuel;

H = Wt. percent hydrogen by ultimate analysis of char fuel;

O = Wt. percent oxygen by ultimate analysis of char fuel;

S = Wt. percent sulfur by ultimate analysis of char fuel;

N = Wt. percent nitrogen by ultimate analysis of char fuel;

These molecular weights and weight percents are for a moisture and ash free char fuel (maf).

$$(F) = \frac{(FC)(MWC) - 32(s) - 14(t)}{12}$$

(FC) = Wt. fraction fixed carbon by proximate analysis (maf) of char fuel;

(MWP) = Average molecular weight of producer gas;

$$(MWP) = \frac{28F + 64s + 14t + 3.76\left(\frac{F}{2} + s\right)(28)}{F + s + \frac{t}{2} + 3.76\left(\frac{F}{2} + s\right)}$$

(MWVMA) = Average molecular weight of volatile matter in air mixture assuming a stoichiometric ratio;

$$(MWVMA) = \frac{138\left(n - F + \frac{m}{4} - \frac{r}{2}\right) + (12n - 12F + m + 16r)}{4.76\left(n - F + \frac{m}{4} - \frac{r}{2}\right) + \frac{12n - 12F + m + 16r}{(MWVM)}}$$

(MWVM) = Average molecular weight of the volatile matter. Values between 100 and 5000 can be used here with very little effect on the estimated volumes ratio.

(TVMA) = Average absolute temperature of the volatile matter in air mixture at maximum compression pressure;

(TPR) = Average absolute temperature of the producer gas at maximum compression pressure;

Accurate estimations of each of these two average temperatures is difficult at best. However the ratio of these two temperatures can be roughly approximated as about two thirds. Those factors, such as external heat transfer or compression ratio, affecting each of these temperatures roughly proportionately.

$$\frac{(TVMA)}{(TPR)} = 0.66 \text{ approximately}$$

These approximate reservoir sizing relations are for air alone as reactant gas. Where a cyclic char burning engine or gasifier is to be used with various char fuels, differing in volatile matter content, the volume of one or both of the producer gas reservoir and the volatile matter in air mixture reservoir can be made adjustable, as by use of add on volumes, or by adjustable piston in cylinder volumes. Such adjustable reservoir volumes could also be used as a means for controlling engine or gasifier torque since the extent of char fuel reaction per cycle varies directly with the gas volume reacted.

As described hereinabove for the form of this invention shown in FIG. 2, the gas flow directions during expansion time intervals are reversed from the gas flow directions during compression time intervals in both the rapid reaction zone and the char fuel preheat and volatile matter distillation zone.

Additional beneficial objects can be achieved by use of changeable gas flow connections between the primary reaction chamber and the variable volume chamber, in order to create single direction of flow, in whole or part, of the producer gas and the volatile matter in air mixture, instead of the fully reversed flow of these gases which occurs in the FIG. 2 form of this invention as described hereinabove. One particular example of such a single direction flow form of this invention is shown schematically in FIG. 3 and comprises:

1. The following elements are similar to those already described for the FIG. 2 form of this invention:

The separate primary reaction chamber, 7, with refuel end, 8, refuel mechanism, 9, pressure vessel container, 10, ash collection end, 11, char fuel motion direction, 12, first gas flow connection, 20, to the variable volume chamber, 3, second gas flow connection, 103, to the variable volume chamber, 3, first reactant gas manifold, 24, with first reactant gas ports, 27, second reactant gas manifold, 101, with second reactant gas ports, 105, producer gas reservoir, 29, producer gas ports, 31, volatile matter in air mixture reservoir, 107, with ports, 109.

2. A first separate producer gas changeable gas flow connection, 22, connects the producer gas reservoir, 29, to the variable volume chamber, 3, and comprises a unidirectional flow means, 38, which creates flow only from the reservoir, 29, into the variable volume chamber, 3.

3. Another second separate volatile matter in air changeable gas flow connection, 21, connects the volatile matter in air mixture reservoir, 107, to the variable volume chamber, 3, and comprises a unidirectional flow means, 37, which creates flow only from the reservoir, 107, into the variable volume chamber, 3.

4. A further third separate reactant gas changeable gas flow connection, 39, connects between the fixed open gas flow connection, 20, into the variable volume chamber, 3, and the inlet, 25, of the first reactant gas manifold, 24, and comprises a unidirectional flow means, 40, which creates flow only from the variable volume chamber, 3, into the first reactant gas manifold, 24.

5. A further fourth separate reactant gas changeable gas flow connection, 111, connects between the fixed open gas flow connection, 103, into the variable volume chamber, 3, and the inlet, 102, of the second reactant gas manifold, 101, and comprises a unidirectional flow means, 112, which creates flow only from the variable volume chamber, 3, into the second reactant gas manifold, 101.

6. The changeable gas flow connections with unidirectional flow means, 22, 38, 21, 37, 39, 40, 111, 112, further comprise means for opening and closing the changeable gas flow connections.

7. A control means is added, operative upon the means for opening and closing the changeable gas flow connections, and driven by the internal combustion engine mechanism so that:

a. both reactant gas changeable gas flow connections, 39, 40, and 111, 112, are open during most of all compression process time intervals, and are closed during most of all expansion time intervals;

b. the producer gas changeable gas flow connection, 22, 38, is closed during most of all compression process time intervals and is open during most of all expansion time intervals;

c. the volatile matter in air mixture changeable gas flow connection, 21, 37, is closed during most of all compression process time intervals and is open during most of all expansion time intervals.

These changeable gas flow connections and drive means and control means thus function to create a single direction flow of gas from the variable volume chamber 3, into the primary reactor, 7, the producer gas reservoir, 29, and the volatile matter in air mixture reservoir, 107, via changeable gas flow connections, 39, 40, 111, 112, during compression. During expansion this single direction of gas flow is continued from the primary reactor, 7, the producer gas reservoir, 29, the volatile matter in air mixture reservoir, 107, into the variable volume chamber, 3, via the two separate changeable gas flow connections, 21, 37 and 22, 38.

The unidirectional flow means, 37, 38, 40, 112, of the changeable gas flow connections can be pressure actuated check valves wherein the pressure difference is the drive means and this pressure difference is controlled by the compression and expansion of the variable volume chamber, 3, driven by the internal combustion engine mechanism, 4. Alternatively mechanically driven valves can be used, opened and closed by linkages from control cams driven by the internal combustion engine mechanism as is well known in the art of gas compressors and internal combustion engines. Two separate unidirectional flow means, 40, 112, are shown in the reactant gas flow connections, 39, 111, but in some applications these can be combined into a single unidirectional flow means.

For cyclic char burning engines we may prefer to direct the volatile matter in air mixture into the variable volume chamber, 3, close to the igniter means, 33, since these volatile matter in air mixtures are usually more readily ignitable than the producer gas in air mixtures. For this purpose the changeable gas flow connection, 21, from the volatile matter in air mixture reservoir, 107, connects into the variable volume chamber 3, adjacent to the igniter means, 33, as shown in FIG. 1. The changeable gas flow connection, 22, from the producer gas reservoir, 29, is preferably connected into the variable volume chamber, 3, next adjacent to where the volatile matter in air mixture connection, 21, is connected in. In this way the volatile matter in air mixture is readily ignited by the igniter means, 33, and the consequently burning volatile matter in air mixture then ignites the producer gas after it has adequately mixed with the secondary air in the variable volume chamber, 3. Prompt ignition and efficient secondary burning are thus achieved in the secondary reactor and these are among the beneficial objects made available by use of unidirectional flow means with this invention.

Wholly single directional gas flow is utilized in the form of this invention shown in FIG. 3 as described hereinabove whereas wholly reversed gas flow is utilized in the form of this invention shown in FIG. 2 as described hereinabove. But other gas flow patterns can alternatively be used. For example, in the FIG. 3 form of this invention, wholly mixed flow can be achieved by removing both reactant gas unidirectional flow means, 40, 112, and gas flow during the expansion time interval will then be partially reversed and partially single directional and hence mixed flow. Such mixed flow can be utilized for only the rapid reaction zone, or for only the char fuel preheat and volatile matter distillation zone, or for both. Also mixed flow for one zone can be combined with either reversed flow or single directional flow in the other zone. The number of unidirectional flow means, and hence the mechanical complexity and cost, are reduced as more of the gas flow is mixed and particularly as more of the gas flow is reversed. Where the cyclic char burning power reactor is a gasifier the product producer gas and volatile matter in air mixture are finally mixed together as the gasifier fuel gas product and wholly reversed flow or part reversed with part mixed flow will frequently be preferred for such applications. Where the cyclic char burning power reactor is an engine we may sometimes prefer to use wholly single directional flow or part single directional flow with part reversed flow when the easier ignitability of the volatile matter in air mixture can be beneficially utilized by keeping the volatile matter in air mixture separated from the producer gas until ignition has occurred.

Figure 4:
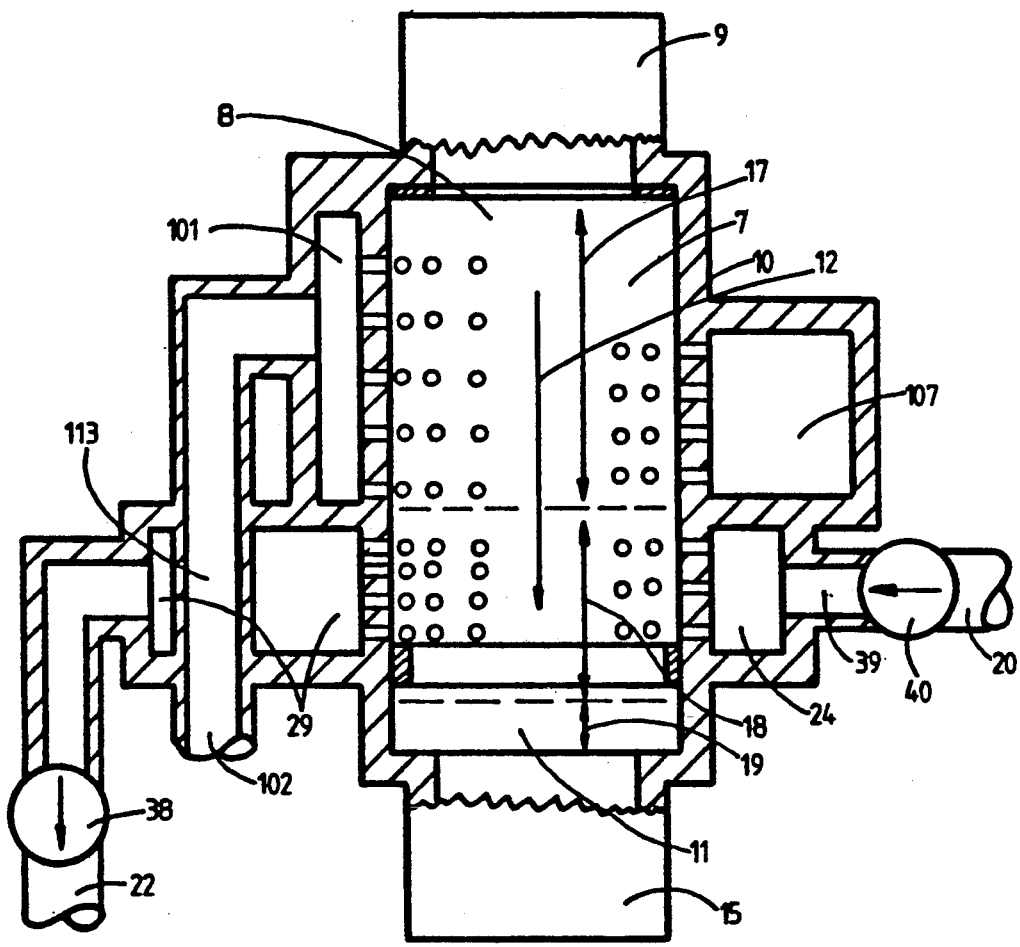
FIG. 4 shows another embodiment of a reaction chamber.

A particular example of an application where single directional flow through the rapid reaction zone will be preferred is shown in FIG. 4, and comprises, in addition to various elements as already shown in FIG. 2 and FIG. 3, a producer gas fired preheater, 113, for the reactant gas flowing into the second reactant gas manifold, 101, and into and through the char fuel preheat and volatile matter distillation zone, 17. The second reactant gas connection, 102, passes through a preheater, 113, in the producer gas reservoir, 29, and in this way the reactant gas passing into second reactant gas manifold, 101, is preheated by the hot producer gas in the reservoir, 29. The reactant gas connection, 102, the preheater, 113, and the producer gas reservoir, 29, are sealed from each other to prevent intermixing of the gases. Such preheating of reactant gas may be preferred when the char fuel being used is high in volatile matter and hence requires appreciable heating, both to evaporate the volatile matter, and to preheat the reactant gas air being admixed therewith. Such preheating of reactant gas also cools the producer gas in the reservoir, 29, and we will prefer that this cool producer gas not reverse flow during expansion back through the rapid reaction zone, 18, where it could chill the hot char fuel therein. Hence in this FIG. 4 example form of the invention changeable gas flow connection, 39, with unidirectional flow means, 40, and changeable gas flow connection, 22, with unidirectional flow means, 38, are used to secure single directional flow of gas through the rapid reaction zone, 18, during both compression and expansion time intervals.

Where the cyclic char burning unit is an engine the producer gas product is to be mixed with the necessary secondary air so that complete combustion of the producer gas can be obtained during expansion in the secondary reactor of the variable chamber. This required secondary air can be simply stored in the variable volume chamber during compression and will be available then during expansion for the burning of the producer gas. Such use of the secondary reactor as also a secondary air reservoir, while mechanically simple, requires proper and prompt mixing of secondary air and producer gas during expansion. The required secondary air can alternatively be stored in whole or part in one or more reactant gas reservoirs, such as are described in U.S. Pat. No. 4,794,729 and incorporated herein by reference, and the desired prompt and proper mixing of secondary air with producer gas during expansion can be more readily obtained with such separate reactant gas reservoirs. Preferably a secondary air reactant gas reservoir is thusly used on each gas flow connection into the variable volume chamber through which producer gas flows into the variable volume chamber during expansion. We will thus prefer separation of those connections through which producer gas flows, from those channels through which volatile matter in air mixture flows, as shown in FIG. 3 and FIG. 4, so that secondary reactant air stored in these secondary air reactant gas reservoirs mixes only into producer gas during expansion and is not wrongly mixed into the volatile matter in air mixture.

Various types of igniter means, 33, can be used for cyclic char burning engines such as electric sparks, glow plugs, burning gas air jets, diesel engine type injectors using highly compression ignitable fuels, etc. as is well known in the art of ignition of combustible fuel in air mixtures.

Having thus described my invention what I claim is:

1. In a cyclic char burning power reactor comprising: at least one combined means for compressing and expanding gases, each said combined means comprising;

an internal combustion engine mechanism comprising a variable volume chamber for compressing and expanding gases, and drive means for driving said internal combustion engine mechanism and for varying the volume of said chamber through repeated cycles, each cycle comprising a compression time interval followed by an expansion time interval, each said combined means for compressing and expanding further comprising, intake means for admitting reactant gases into said variable volume chamber prior to each said compression time interval, exhaust means for removing reacted gases from said variable volume chamber after each said expansion time interval; each said combined means for compressing and expanding being connected to a separate primary reaction chamber, containing char fuel, within a pressure vessel container, each said primary reaction chamber comprising; a refuel end with a refuel mechanism means for supplying fresh char fuel particles into said refuel end, an ash collection end, a char fuel direction of motion from said refuel end toward said ash removal end, a peripheral dimension around the outer surface of said primary reaction chamber at right angles to said char fuel motion direction, each said primary reaction chamber further comprising, a char fuel preheat and volatile matter distillation zone positioned toward said refuel end of said primary reaction chamber, an ash collection zone positioned toward said ash collection end of said primary reaction chamber, and a rapid reaction zone positioned between said char fuel preheat and volatile matter distillation zone and said ash collection zone, each said primary reaction chamber further comprising at least one means for removing ashes; said char burning power reactor further comprising a source of supply of reactant gas containing appreciable oxygen gas to each said intake means for admitting reactant gases into said variable volume chamber; said char burning power reactor further comprising: means for preheating said char fuel within said primary reaction chamber to that temperature at which said char fuel reacts rapidly with oxygen in adjacent compressed reactant gases when said char burning power reactor is being started; means for cranking said internal combustion engine mechanism when said char burning power reactor is being started:

an improvement comprising:
dividing said peripheral dimension of said primary reaction chamber into separate inlet portions, separate outlet portions, and separate sealed portions;
and adding to each said primary reaction chamber:
two separate reactant gas manifolds and each said reactant gas manifold comprising an inlet and an outlet; a first reactant gas manifold whose outlet connects to first reactant gas inlet ports into said primary reaction chamber, and these first inlet ports being positioned along that portion of the length of said primary reaction chamber, in said direction of char fuel motion, which is adjacent to said rapid reaction zone, and these first inlet ports being positioned around a first said inlet portion of the periphery of said primary reaction chamber; a second reactant gas manifold whose outlet connects to second reactant gas inlet ports into said primary reaction chamber, and these second inlet ports being positioned along that portion of the length of said primary reaction chamber, in said direction of char fuel motion, which is adjacent to said char fuel preheat and volatile matter distillation zone, and the second inlet ports being positioned around a second said inlet portion of the periphery of said primary reaction chamber;

a producer gas reservoir comprising an inlet, said inlet connecting to producer gas outlet ports out of said primary reaction chamber, and these ports positioned along that portion of said length of said primary reaction chamber along said direction of char fuel motion which is adjacent to said rapid reaction zone, and these ports positioned around a first outlet portion of the periphery of said primary reaction chamber, said first outlet portion of said periphery being on the opposite side of said primary reaction chamber from said first inlet portion of said periphery;

a volatile matter in air mixture reservoir comprising an inlet, said inlet connecting to volatile matter in air mixture outlet ports out of said primary reaction chamber, and these ports positioned along that portion of said length of said primary reaction chamber along said direction of char fuel motion which is adjacent to said char fuel preheat and volatile matter distillation zone, and these ports positioned around a second outlet portion of the periphery of said primary reaction chamber, said second outlet portion of the periphery being on the opposite side of said primary reaction chamber from said second inlet portion of said periphery;

reactant fixed open gas flow connections from said variable volume chamber of said internal combustion engine mechanism to said inlet of said first reactant gas manifold, and to said inlet of said second reactant gas manifold.

2. In a cyclic char burning power reactor as described in claim 1 and further comprising:
mixed flow means for creating partially reversed flow and partially single direction gas flow during compression and expansion time intervals from at least one of said rapid reaction zone and said char fuel preheat and volatile matter distillation zone; said mixed flow means comprising:
an outlet on at least one of said producer gas reservoir and said volatile matter in air mixture reservoir;
at least one product gas changeable gas flow connection between said variable volume chamber and the outlet of each said reservoir further comprising an outlet, said product gas changeable gas flow connections comprising means for opening and closing said changeable gas flow connections;
control means, operative upon said means for opening and closing said changeable gas flow connections, and actuated in turn by said internal combustion engine mechanism of said cyclic char burning power reactor, for controlling the opening and closing of said changeable gas flow connections so that
all said product gas changeable gas flow connections are closed during most of all compression process time intervals and are open during most of all expansion time intervals of said connected variable volume chamber.

3. In a cyclic char burning power reactor as described in claim 2 wherein each said variable volume chamber of said internal combustion engine mechanism comprises a secondary reaction chamber and an igniter means for igniting fuel gas in air mixtures.

4. In a cyclic char burning power reactor as described in claim 1 and further comprising:
single direction flow means for creating unidirectional gas flow during compression and expansion time intervals through at least one of said rapid reaction zone and said char fuel preheat and volatile matter distillation zone; said single direction flow means comprising:
an outlet on at least one of said producer gas reservoir and said volatile matter in air mixture reservoir;
at least one product gas changeable gas flow connection between said variable colume chamber and the outlet of each said reservoir further comprising an outlet, said product gas changeable gas flow connections comprising means for opening and closing said changeable gas flow connections;
at least one reactant gas changeable gas flow connection between said open gas flow connection from said variable volume chamber to each said inlet of those reactant gas manifolds through which reactant gas flows into those reservoirs further comprising outlets, said reactant gas changeable gas flow connections comprising means for opening and closing said changeable gas flow connections;
control means, operative upon said means for opening and closing said changeable gas flow connections, and actuated in turn by said internal combustion engine mechanism of said cyclic char burning power reactor, for controlling the opening and closing of said changeable gas flow connections so that:
all said product gas changeable gas flow connections are closed during most of all compression process time intervals and are open during most of all expansion time intervals of said connected variable volume chamber;
all said reactant gas changeable gas flow connections are open during most of all compression process time intervals and are closed during most of all expansion time intervals of said connected variable volume chamber.

5. In a cyclic char burning power rector as described in claim 4 wherein:
each said variable volume chamber of said internal combustion engine mechanism comprises a secondary reaction chamber and an igniter means for igniting fuel gas in air mixtures.

6. In a cyclic char burning power rector as described in claim 4:
wherein said inlet of said second reactant gas manifold passes through said producer gas reservoir and is sealed therefrom.

7. In a cyclic char burning power reactor as described in claim 6 wherein:
each said variable volume chamber of said internal combustion engine mechanism comprises a secondary reaction chamber and an igniter means for igniting fuel gas in air mixtures.

8. In a cyclic char burning power reactor as described in claim 1:
wherein each said variable volume chamber of said internal combustion engine mechanism comprises a secondary reaction chamber and an igniter means for igniting fuel gas in air mixtures.

9. In a cyclic char burning power reactor as described in claim 1 wherein:
said first inlet portion of the periphery of said primary reaction chamber is on the opposite side of said primary reaction chamber from said second inlet portion of the periphery of said primary reaction chamber.

10. In a cyclic char burning power reactor as described in claim 9 and further comprising:
mixed flow means for creating partially reversed flow and partially single direction gas flow during compression and expansion time intervals from at least one of said rapid reaction zone and said char fuel preheat and volatile matter distillation zone; said mixed flow means comprising:
an outlet on at least one of said producer gas reservoir and said volatile matter in air mixture reservoir;
at least one product gas changeable gas flow connection between said variable volume chamber and the outlet of each said reservoir further comprising an outlet, said product gas changeable gas flow connections comprising means for opening and closing said changeable gas flow connections;
control means, operative upon said means for opening and closing said changeable gas flow connections, and actuated in turn by said internal combustion engine mechanism of said cyclic char burning power reactor, for controlling the opening and closing of said changeable gas flow connections so that
all said product gas changeable gas flow connections are closed during most of all compression process time intervals and are open during most of all expansion time intervals of said connected variable volume chamber.

11. In a cyclic char burning power reactor as described in claim 10 wherein:
each said variable volume chamber of said internal combustion engine mechanism comprises a secondary reaction chamber and an igniter means for igniting fuel gas in air mixtures.

12. In a cyclic char burning power reactor as described in claim 9 and further comprising:
single direction flow means for creating unidirectional gas flow during compression and expansion time intervals through at least one of said rapid reaction zone and said char fuel preheat and volatile matter distillation zone; said single direction flow means comprising:
an outlet on at least one of said producer gas reservoir and said volatile matter in air mixture reservoir;
at least one product gas changeable gas flow connection between said variable volume chamber and the outlet of each said reservoir further comprising an outlet, said product gas changeable gas flow connections comprising means for opening and closing said changeable gas flow connections;
at least one reactant gas changeable gas flow connection between said open gas flow connection from said variable volume chamber to each said inlet of those reactant gas manifolds through which reactant gas flows into those reservoirs further comprising outlets, said reactant gas changeable gas flow connections comprising means for opening and closing said changeable gas flow connections;

control means, operative upon said means for opening and closing said changeable gas flow connections, and actuated in turn by said internal combustion engine mechanism of said cyclic char burning power reactor, for controlling the opening and closing of said changeable gas flow connections so that:

all said product gas changeable gas flow connections are closed during most of all compression process time intervals and are open during most of all expansion time intervals of said connected variable volume chamber;

all said reactant gas changeable gas flow connections are open during most of all compression process time intervals and are closed during most of all expansion time intervals of said connected variable volume chamber.

13. In a cyclic char burning power reactor as described in claim 12:
wherein each said variable volume chamber of said internal combustion engine mechanism comprises a secondary reaction chamber and an igniter means for igniting fuel gas in air mixtures.

14. In a cyclic char burning power reactor as described in claim 12:
wherein said inlet of said second reactant gas manifold passes through said producer gas reservoir and is sealed therefrom.

15. In a cyclic char burning power reactor as described in claim 14:
wherein each said variable volume chamber of said internal combustion engine mechanism comprises a secondary reaction chamber and an igniter means for igniting fuel gas in air mixtures.

16. In a cyclic char burning power reactor as described in claim 9:
wherein each said variable volume chamber of said internal combustion engine mechanism comprises a secondary reaction chamber and an igniter means for igniting fuel gas in air mixtures.

* * * * *